United States Patent
Fong et al.

(10) Patent No.: US 12,307,280 B2
(45) Date of Patent: May 20, 2025

(54) MANAGEMENT AND UTILIZATION OF NETWORK INTERFACE CARD RESOURCES FOR WORKLOAD EXECUTION

(71) Applicant: Dell Products L.P., Round Rock, TX (US)

(72) Inventors: Victor Fong, Melrose, MA (US); Kranti Uppala, Milford, MA (US); Geoffrey A. Reid, Littleton, MA (US)

(73) Assignee: Dell Products L.P., Round Rock, TX (US)

( * ) Notice: Subject to any disclaimer, the term of this patent is extended or adjusted under 35 U.S.C. 154(b) by 686 days.

(21) Appl. No.: 17/678,702

(22) Filed: Feb. 23, 2022

(65) Prior Publication Data

US 2023/0266988 A1 Aug. 24, 2023

(51) Int. Cl.
G06F 9/455 (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,923,320 B2* | 12/2014 | Dasari | ...................... | H04L 47/82 370/437 |
| 10,757,170 B2* | 8/2020 | Thakkar | .............. | H04L 67/1097 |
| 11,422,840 B2* | 8/2022 | Warkentin | .......... | G06F 9/45558 |
| 11,513,809 B2* | 11/2022 | Buswell | .................... | G06F 8/63 |
| 2014/0161137 A1* | 6/2014 | Dasari | ................. | H04L 41/0803 370/437 |
| 2015/0301844 A1* | 10/2015 | Droux | ................. | G06F 9/45558 718/1 |
| 2018/0109387 A1* | 4/2018 | Vyas | ......................... | G06F 8/71 |
| 2018/0336055 A1* | 11/2018 | Bernardini | .......... | G06F 9/45558 |
| 2020/0092271 A1* | 3/2020 | Kumar | ................ | G06F 9/45533 |
| 2020/0344182 A1* | 10/2020 | Tsirkin | ................ | G06F 9/45558 |
| 2021/0311792 A1* | 10/2021 | Rosoff | .................. | G06F 9/5027 |
| 2022/0197681 A1* | 6/2022 | Rajagopal | ........... | G06F 9/45558 |

(Continued)

OTHER PUBLICATIONS

Yan Luo; "Network I/O virtualization for Cloud Computing"; University of Massachusetts Lowell; IEEE Computer Society; Sep./Oct. 2010; (Luo_2010.pdf; pp. 36-41) (Year: 2010).*

(Continued)

*Primary Examiner* — Hiren P Patel
(74) *Attorney, Agent, or Firm* — Ryan, Mason & Lewis, LLP

(57) ABSTRACT

A method comprises receiving a request for at least one network interface card resource, and identifying one or more network interface cards comprising the at least one network interface card resource. In the method, at least one virtualized computing resource image is received, and a workload is executed using an instance of the at least one virtualized computing resource image running on the one or more network interface cards. Workload execution includes implementation of a binding mechanism using one or more control groups and a given protocol. In addition, a cluster including one or more nodes comprising the identified one or more network interface cards is generated.

20 Claims, 7 Drawing Sheets

(56) References Cited

U.S. PATENT DOCUMENTS

| | | | |
|---|---|---|---|
| 2022/0206962 A1* | 6/2022 | Kim | G06F 13/102 |
| 2022/0321468 A1* | 10/2022 | Mestery | H04L 45/566 |
| 2022/0385631 A1* | 12/2022 | McDowall | H04L 63/1433 |
| 2023/0012308 A1* | 1/2023 | Kommula | H04L 41/122 |
| 2023/0051825 A1* | 2/2023 | Chang | G06F 3/0635 |

OTHER PUBLICATIONS

Nvidia Corporation, "Nvidia GPUDirect," https://developer.nvidia.com/gpudirect, Accessed Jan. 19, 2022, 5 pages.

S. McCarty, "Architecting Containers Part 1: Why Understanding User Space vs. Kernel Space Matters," https://www.redhat.com/en/blog/architecting-containers-part-1-why-understanding-user-space-vs-kernel-space-matters, Jul. 29, 2015, 10 pages.

Wikipedia, "cgroups," https://en.wikipedia.org/w/index.php?title=Cgroups&oldid=1050179936, Oct. 16, 2021, 7 pages.

Aqua Security, "Container Images: Architecture and Best Practices," https://www.aquasec.com/cloud-native-academy/container-security/container-images/, Accessed Jan. 20, 2022, 11 pages.

PC Mag Digital Group, "ARM," https://www.pcmag.com/encyclopedia/term/arm, Accessed Jan. 22, 2022, 4 pages.

Docker Inc., "Docker Registry," https://docs.docker.com/registry/, Accessed Jan. 19, 2022, 2 pages.

A. Lock, "Creating Docker Multi-arch Images for ARM64 from Windows," https://andrewlock.net/creating-multi-arch-docker-images-for-arm64-from-windows/, Jun. 15, 2021, 5 pages.

Kata Containers, "The Speed of Containers, the Security of VMs," https://katacontainers.io/, Accessed Jan. 19, 2022, 4 pages.

A. Viviano, "Overview of Single Root I/O Virtualization (SR-IOV)," https://docs.microsoft.com/en-us/windows-hardware/drivers/network/overview-of-single-root-i-o-virtualization--sr-iov-#:~:text=The, Dec. 14, 2021, 2 pages.

The Kubernetes Authors, "kube-controller-manager," https://kubernetes.io/docs/reference/command-line-tools-reference/kube-controller-manager/, Dec. 8, 2021, 15 pages.

Wikipedia, "Network Interface Controller," https://en.wikipedia.org/w/index.php?title=Network_interface_controller&oldid=1060676248, Dec. 17, 2021, 6 pages.

Unix & Linux, "What is difference between User space and Kernel space?" https://unix.stackexchange.com/questions/87625/what-is-difference-between-user-space-and-kernel-space, Accessed Nov. 23, 2021, 10 pages.

The Linux Foundation, "XDP: eXpress Data Path," https://www.iovisor.org/technology/xdp, Accessed Jan. 19, 2022, 4 pages.

Wikipedia, "User Space," https://en.wikipedia.org/w/index.php?title=User_space&oldid=1052063093, Oct. 27, 2021, 3 pages.

K. Deierling, "What Is a SmartNIC?" https://blogs.nvidia.com/blog/2021/10/29/what-is-a-smartnic/#:~:text=A, Oct. 29, 2021, 22 pages.

S. J. Bigelow, "What is Edge Computing? Everything you Need to Know," https://www.techtarget.com/searchdatacenter/definition/edge-computing, Accessed Jan. 19, 2022, 11 pages.

The Kubernetes Authors, "Workloads," https://kubernetes.io/docs/concepts/workloads/, Oct. 15, 2020, 2 pages.

U.S. Appl. No. 17/676,580 filed in the name of Victor Fong et al. filed Feb. 21, 2022, and entitled "Physical Hardware Controller for Provisioning Services on Processing Devices."

U.S. Appl. No. 17/682,077 filed in the name of Amy N. Seibel et al. filed Feb. 28, 2022, and entitled "Edge Utility System with Dynamic Aggregation of Edge Resources Across Multiple Edge Computing Sites."

* cited by examiner

MANAGEMENT AND UTILIZATION OF NETWORK INTERFACE CARD RESOURCES FOR WORKLOAD EXECUTION

FIELD

The field relates generally to information processing systems and more particularly, to managing and utilizing resources in such information processing systems.

BACKGROUND

A smart network interface card ("SmartNIC") is a type of network interface controller that includes various computational resources. For example, some SmartNICs include central processing units (CPUs), random access memories (RAMs), field programmable gate arrays (FPGAs) and/or graphics processing units (GPUs). A SmartNIC typically has its own operating system, which is separate from a host device operating system. As a result, data processing can be performed within a SmartNIC without host involvement. There are also SmartNICs capable of directly accessing hardware devices on a host device, while bypassing the host kernel and user spaces, so that real-time processing can be accelerated. While SmartNICs offer potential increases in processing speed for many use cases, there are difficulties with leveraging SmartNIC resources in certain environments where user access to SmartNICs is prevented.

SUMMARY

Illustrative embodiments of the present disclosure provide techniques for the management and utilization of network interface card resources for workload execution.

In one embodiment, a method comprises receiving a request for at least one network interface card resource, and identifying one or more network interface cards comprising the at least one network interface card resource. In the method, at least one virtualized computing resource image is received, and a workload is executed using an instance of the at least one virtualized computing resource image running on the one or more network interface cards.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide techniques for provisioning SmartNIC resources as a service to perform user workloads in a multi-tenant environment. The technical solutions described herein provide a runtime environment for SmartNICs that isolates user processes from system level processes, so that user processes can be executed on SmartNICs while protecting system level processes and data from security breaches.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
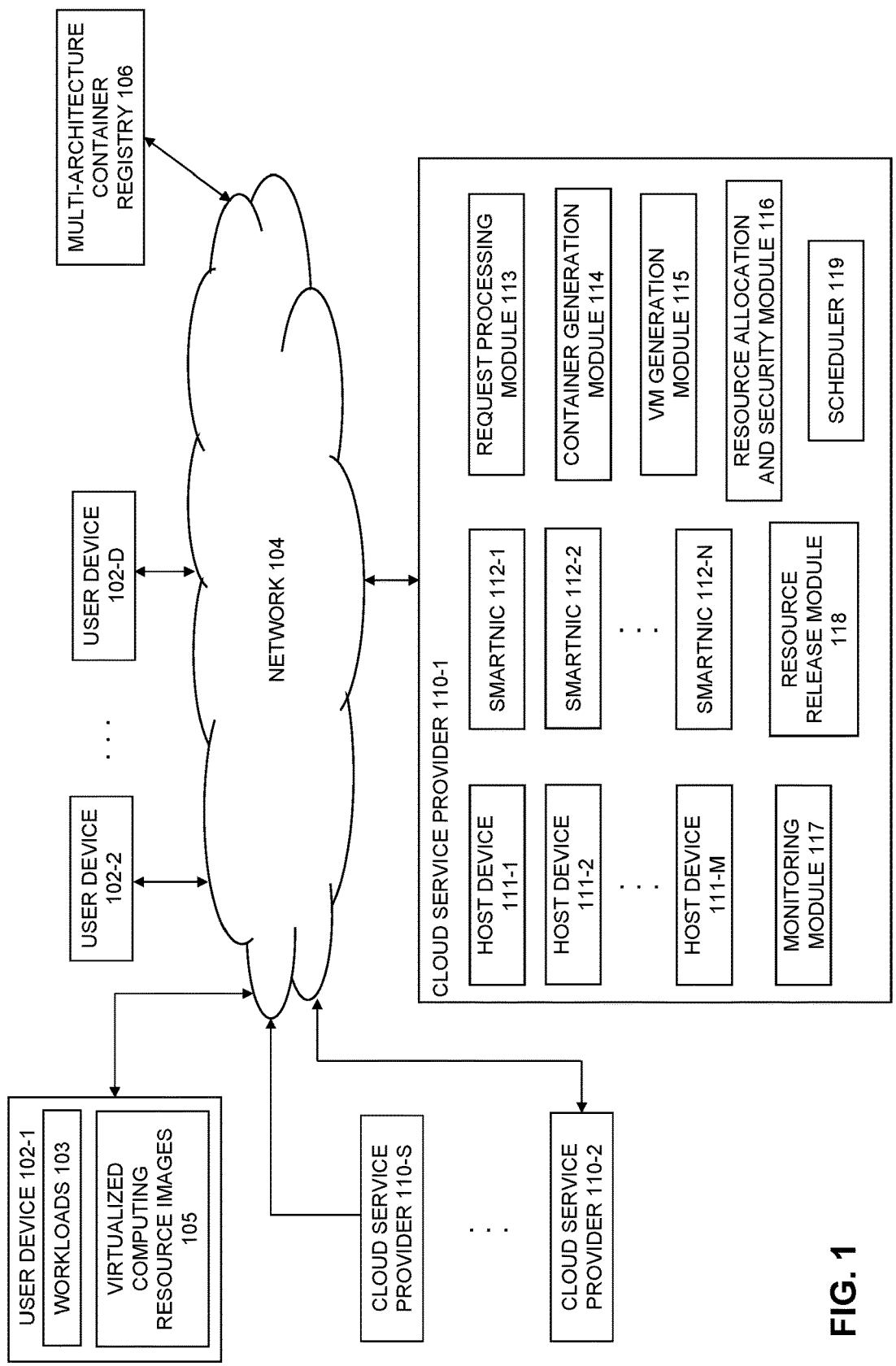
FIG. 1 is a block diagram of an information processing system configured for assigning one or more SmartNICs to execute one or more workloads in an illustrative embodiment.

FIG. 1 shows an information processing system 100 configured in accordance with an illustrative embodiment for assigning one or more SmartNICs to execute one or more workloads. The information processing system 100 comprises a set of user devices 102-1, 102-2, . . . 102-D (collectively, user devices 102) which communicate over network 104 with respective cloud service providers 110-1, 110-2, . . . 110-S (collectively, cloud service providers 110). The user devices 102 and the cloud service providers 110 may also communicate over the network 104 with a multi-architecture container registry 106.

The user devices 102 can comprise, for example, Internet of Things (IoT) devices, desktop, laptop or tablet computers, mobile telephones, or other types of processing devices capable of communicating with the cloud service providers 110, the multi-architecture container registry 106 and each other over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable D and other similar index variables herein such as K, L, M, N and S are assumed to be arbitrary positive integers greater than or equal to one.

The terms "client," "customer," "administrator" or "user" herein are intended to be broadly construed so as to encompass numerous arrangements of human, hardware, software or firmware entities, as well as combinations of such entities. Compute and/or storage services (e.g., at least a portion of the available services and functionalities provided by the cloud service providers 110) may be provided for users under a Platform-as-a-Service (PaaS) model, an Infrastructure-as-a-Service (IaaS) model, a Function-as-a-Service (FaaS) model, a Containers-as-a-Service (CaaS) model and/or a Storage-as-a-Service (STaaS) model, including cloud-based PaaS, IaaS, FaaS, CaaS and STaaS environments, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1, one or more input-output devices such as keyboards, displays or other types of input-output devices may be used to support one or more user interfaces to the cloud service providers 110, as well as to support communication between the cloud service providers 110 and connected devices (e.g., user devices 102) and/or other related systems and devices not explicitly shown.

Users may refer to customers, clients and/or administrators of computing environments for which workload execution is being performed. For example, in some embodiments, the user devices 102 are assumed to be associated with repair technicians, system administrators, information technology (IT) managers, software developers release management personnel or other authorized personnel configured to access and utilize the cloud service providers 110.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, a user device 102-1 includes workloads 103 and virtualized computing resource images 105 (e.g., VM and/or container images). Although not shown, other user devices 102-2, . . . , 102-D similarly include workloads 103 and virtualized computing resource images 105. Workloads 103 comprise, for example, applications running as single components or several components working together. In one or more embodiments, the workloads 103 may run inside a plurality of pods. As used herein, a "pod" is to be broadly construed to refer to one or more containers running in a cluster of compute nodes. Virtualized computing resource images 105 comprise, for example, static files with executable code that can create a VM or container on a computing system. As explained in more detail herein, the virtualized computing resource images 105 can be deployed by the cloud service providers 110 to run virtualized computing resource instances on SmartNICs to execute one or more workloads 103. The virtualized computing resource images 105 include elements required to run a virtualized computing resource such as, for example, system libraries, utilities, configuration settings, and specific workloads 103. In the case of a container, a container image includes a container engine such as Docker or CoreOS.

As shown in FIG. 1, a cloud service provider 110-1 includes a plurality of host devices 111-1, 111-2, . . . , 111-M (collectively, host devices 111) and a plurality of SmartNICs 112-1, 112-2, . . . , 112-N (collectively, SmartNICs 112). The host devices 111 can comprise, for example, computers or other types of devices that are more generally referred to herein as "processing devices." The host devices 111 may also or alternately comprise virtualized computing resources, such as VMs, containers, etc. Cloud service provider 110-1 further includes a request processing module 113, a container generation module 114, a VM generation module 115, a resource allocation and security module 116, a monitoring module 117, a resource release module 118 and a scheduler 119. Although not shown, other cloud service providers 110-2, . . . , 110-S similarly include host devices 111, SmartNICs 112, a request processing module 113, a container generation module 114, a VM generation module 115, a resource allocation and security module 116, a monitoring module 117, a resource release module 118 and a scheduler 119.

Figure 2:
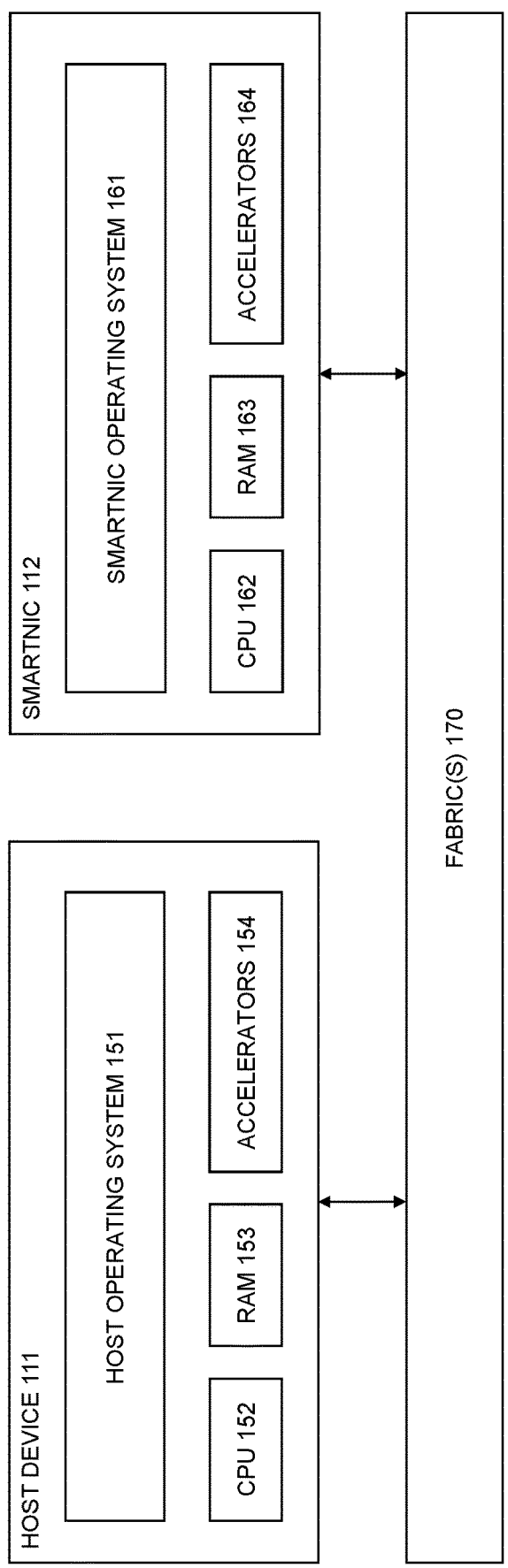
FIG. 2 shows a fabric connection between a host device and a SmartNIC in an illustrative embodiment.

Referring to FIG. 2, a host device 111 comprises a host operating system 151, a CPU 152, RAM 153 and accelerators 154. A SmartNIC 112 comprises a SmartNIC operating system 161, a CPU 162, RAM 163 and accelerators 164. SmartNICs 112 may comprise "miniature" computers or mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. A SmartNIC 112 illustratively has its own process and memory space, and is capable of executing a SmartNIC operating system (OS) 161 in a standalone fashion (e.g., separate from a host OS 151 that runs or executes on the host devices 111). FIG. 2 illustrates a connection between a host device 111 and a SmartNIC 112. As shown, the host device 111 and the SmartNIC 112 are connected via one or more fabrics 170. The fabrics 170 comprise, for example, Universal Serial Bus (USB), Peripheral Component Interconnect Express (PCIe), or other types of high bandwidth and no (or minimal) latency fabrics. The host device 111 has a host OS 151, as well as one or more processors (e.g., CPU 152), one or more memories (e.g., RAM 153), and one or more accelerators 154. Similarly, the SmartNIC 112 has a SmartNIC OS 161, one or more processors (e.g., CPU 162), one or more memories (e.g., RAM 163), and one or more accelerators 164.

SmartNICs 112 include a plurality of built-in computation resources that can be used to accelerate workload processing without involvement of host devices 111. For example, data processing from network traffic can be processed within a given SmartNIC 112 without host device involvement. When there is a need for a host device 111 to be involved, the SmartNIC 112 can process data and initial results coming from the SmartNIC 112. In one or more embodiments, a SmartNIC 112 can bypass the host kernel and user spaces and access hardware devices on the host device 111 directly, so that real-time processing can be accelerated, without data replication and host processing. Using their own CPU 162, RAM 163 and accelerators 164 separate from the CPU 152, RAM 153 and accelerators 154 of a host device 111, SmartNICs 112 run their own SmartNIC operating systems 161, which are separated from host operating systems 151 of the host devices 111. Some example use cases for workloads 103 that can be run on SmartNICs 112 include, but are not necessarily limited to, machine learning prediction tasks and training (including real-time machine learning prediction and training), system level process and hypervisor offloading, computational storage, advanced composable infrastructure processes and providing virtual switches for communication between VMs.

While SmartNICs offer potential acceleration for many use cases, there are technical problems for developers and customers when attempting to leverage the SmartNICs in a multi-tenant environment (e.g., cloud or Telco edges). Under conventional approaches, in order to place workloads on SmartNICs, the workloads would need to co-locate with other system processes, causing concerns in security, resource management and orchestration. Additionally, in conventional arrangements, cloud service providers prevent users from gaining access to SmartNICs.

A technical problem with current approaches is that SmartNICs are consumed by system workloads without being accessible to developers for other workloads. For example, cloud service providers marginalize SmartNICs for system level software without providing techniques for developers and other users to gain access to the SmartNICs to deploy advanced workloads and take advantage of the acceleration offered by the SmartNICs.

Another technical problem with conventional approaches relates to isolation and security for workloads executing on a SmartNIC. For example, when a workload is executed on a SmartNIC, it is currently difficult to isolate the execution environment of the workload from other system processes that are parallelly executing on the same SmartNIC. As a result, eavesdropping on network traffic may occur and cross-process security is an issue since administrative and system level software is also running on the SmartNIC.

Advantageously, the technical solutions described herein provide users with access to SmartNICs to perform workloads other than system level workloads. As an additional advantage, the embodiments isolate different workloads executing on a SmartNIC so that security is not compromised. The technical solutions described herein provide users with a gateway to SmartNIC as a service capabilities, where user processes are isolated from system level processes, allowing user workloads to be executed in a controlled environment, while protecting system level processes, resources and data from potential rogue users.

In more detail, referring to FIG. 1, users through user devices 102 have access to one or more cloud service providers 110, each hosting SmartNICs 112 as part of their underlying IaaS offerings. In one or more embodiments, the SmartNICs 112 include a Linux OS that supports control groups (cgroups). In more detail, a given container may include a plurality of processes with sub-groups of the processes respectively corresponding to different cgroups. The use of cgroups facilitates management and monitoring of SmartNIC resources. As an alternative to containers and cgroups, the embodiments can also utilize VMs in connection with the application of workloads on the SmartNICs 112. For example, depending on hardware and OS implementations, kernel-based virtual machine (KVM) technology can be supported.

In one or more embodiments, a service portal is provided by a cloud service provider 110, where a user can request network interface card resources (e.g., SmartNIC resources) within a CaaS model. For example, referring to blocks 301 and 302 of the operational flow 300 in FIG. 3, a user accesses a cloud service provider portal and requests a SmartNIC resource. In more detail, referring back to FIG. 1, a request processing module 113 comprises a service registry or declarative application programming interface (API) model which receives a user request for at least one network interface card resource. For example, based on available service plans, users via a user interface on a user device 102, can choose from available resources, as well as available quality of service (QoS) options. For example, plans can include SmartNICs with a CPU (e.g., an advanced reduced instruction set computer (RISC) machine (ARM) CPU), a GPU, a partition of a CPU, GPU computational time slices and GPU memory. A user can select a service plan best suited for a use case. In one or more embodiments, referring to block 303 of the operational flow 300, the request processing module 113 identifies SmartNICs 112 comprising the requested resource(s) and generates a cluster comprising the identified SmartNICs 112 as per the user requirements. Referring to block 304, a check is performed to determine whether the generated cluster meets the user requirements. If the cluster does not meet the user requirements, the operational flow 300 proceeds to block 305, where the deployment fails and returns to block 303 where a new cluster is generated as per the user requirements. Alternatively, when the deployment fails at block 305, the operational flow 300 may return to block 302 where another request for a SmartNIC resource is processed. If the cluster does meet the user requirements, the operational flow 300 proceeds to block 306, where the virtualized computing resource images 105 are uploaded to the cloud service provider 110. For example, a user can upload one or more container images corresponding to one or more workloads 103.

A user may upload a kernel configuration (kernel config) image corresponding to a SmartNIC that will support cgroups and namespaces, which may be required to run containers and virtual networks. This kernel image will be different from a kernel image for a host device 111, which has a different architecture from a SmartNIC 112. Cgroups limit the resources that a process or set of processes can use, while namespaces restrict the visibility of a group of processes to the rest of the system. The namespace is a way for a container (e.g., set of isolated processes) to have a different set of permissions than the system itself. In a non-limiting example, when a container is run, Docker creates a set of namespaces for that container, which provide a layer of isolation. Each aspect of a container runs in a separate namespace and its access is limited to that namespace.

In one or more embodiments, the user can also upload the virtualized computing resource images 105 (e.g., container images) to a multi-architecture container (e.g., Docker) registry 106 so that the host device(s) 111 and SmartNIC(s) 112 can pull the images from the multi-architecture container registry 106 as required. In one or more embodiments, container images are able to execute on both a host device 111 (e.g., x86 host device) and a SmartNIC 112 (e.g., SmartNIC with ARM cores). In the case when a SmartNIC 112 with the requested resource becomes unavailable, the same container path would be able to execute on a host device 111 (e.g., x86 host device) but with a different image. When a SmartNIC 112 is unavailable, since container images can be compiled to support multiple architectural types and some workloads 103 can also execute on a host device 111 without the acceleration offered by the SmartNIC 112, a scheduler 119 can execute a given workload 103 on a host device 111 without additional cost.

The container generation module 114 and the VM generation module 115 generate running instances of container and/or VM images on the SmartNICs 112 based on the uploaded virtualized computing resource images 105. Workloads 103 are uploaded to the running instances of the container and/or VM images. The workloads 103 are targeted to run on the SmartNICs 112 having the requested resources. For example, referring to block 307 of FIG. 3, a pod comprising, for example, one or more containers running in a cluster of SmartNICs 112, is deployed on a worker corresponding to the requested SmartNIC resources to process the workloads 103. For example, referring to blocks 308 and 309, a given workload 103 is deployed and offloaded to a SmartNIC 112 allocated to the pod. The workload 103 is executed using an instance of a virtualized computing resource image 105 running on one or more SmartNICs 112. For example, in connection with a running instance of a container image, a resulting container on a SmartNIC 112 will use the libraries and framework supporting the offloading of the workload 103 to the SmartNIC 112. As a SmartNIC 112 may be labeled differently on the cluster, the orchestration of the container image can be done by a selector with information provided from a service catalog.

As noted herein, the embodiments address the technical problem of isolation and security for workloads executing on a SmartNIC. Referring to FIG. 1 and to block 310 of FIG. 3, depending on the implementation of a SmartNIC 112 and workloads 103, a resource allocation and security module 116 uses different mechanisms to allocate resources and ensure workload security for workloads 103 being executed by a SmartNIC 112. These mechanisms include, but are not necessarily limited to, single root input-output virtualization (SRIOV), Kata containers and eXpress data path (XDP) mechanisms. The SRIOV interface is an extension to the PCIe specification, allowing a device, such as a network adapter, to separate access to its resources among various PCIe hardware functions. For example, PCIe physical and virtual functions may be assigned unique identifiers that allow for differentiation between different traffic streams and application of memory and interrupt translations between the physical and virtual functions. Kata containers provide for secure container runtime using lightweight VMs that provide workload isolation using hardware virtualization technology.

In one or more embodiments, as a workload 103 is executed on a container provided by a cloud service provider 110, there will be a binding mechanism implemented using cgroups and XDP protocol. The cgroups within the Linux kernel isolate workloads 103 by assigning required resources and monitoring the resources. XDP protocol provides a high performance, programmable network data path in the Linux kernel by offering packet processing at the earliest point in a software stack, making XDP useful for speed without compromising programmability. For example, network traffic to an application container will be bound by using XDP drivers that will help with fast processing of the traffic at the earliest point in the network stack, thereby avoiding unnecessary cross-transmission of traffic to system level workloads within the SmartNIC 112. As soon as the packets reach a SmartNIC receiver, XDP hooks are invoked in the user space with certain filters built in to handle the allocation of the packets to the user space container.

Figure 3:
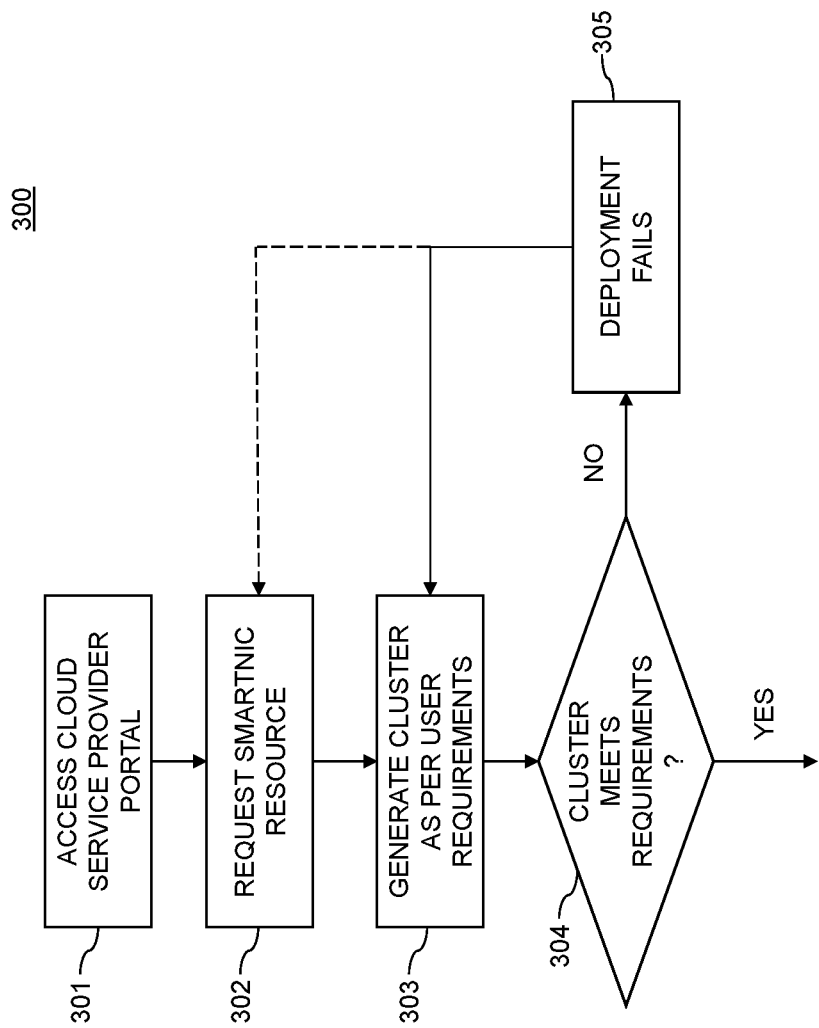
FIG. 3 is a flow diagram of an exemplary process for processing a request for one or more SmartNIC resources and assigning one or more SmartNICs to execute one or more workloads in an illustrative embodiment.
Figure 3:
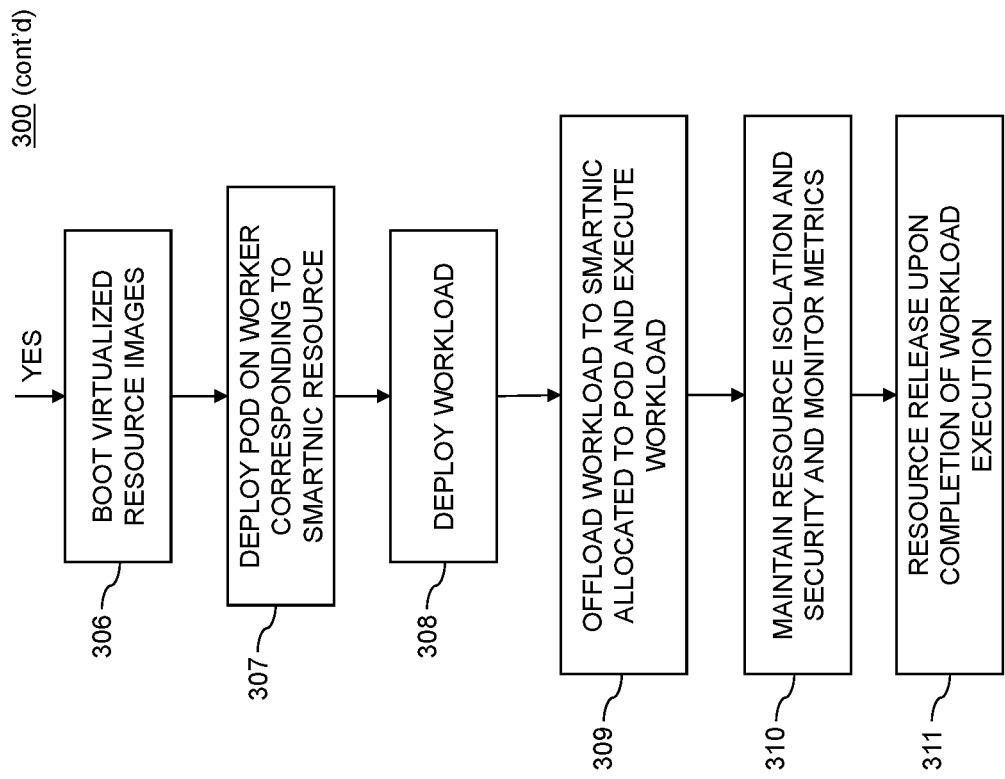

Referring again to FIG. 1 and to block 310 of FIG. 3, a monitoring module 117 monitors the health of the SmartNICs 112. In more detail, the monitoring module 117 uses a virtualized resource management application (e.g., Kubernetes® container orchestration system) and/or a telemetry and service mesh to monitor metrics of the SmartNICs 112 and the virtualized resources running on the SmartNICs 112. For example, a Kubernetes® controller manager (kube-controller-manager) monitors cluster nodes, workloads 103, namespaces and service accounts.

Referring to FIG. 1 and to block 311 of FIG. 3, once execution of a workload 103 is complete, the resource release module 118 disintegrates the containers and releases the resources of the SmartNIC 112 used to execute the workload 103.

In an operational example, a vehicle dealership includes a video security system to track all the vehicles that enter and leave the dealership location. This system would collect data from multiple live video feeds of the dealership and utilize SmartNICs with GPU resources. For example, a cluster of SmartNICs 112 would include multiple SmartNICs 112 comprising GPUs to perform video processing workloads. The video processing workloads may comprise recognition machine learning models loaded onto the GPUs to determine from the video feeds whether a vehicle is in the feed. If there is a vehicle in the video feed, the feed can be further processed by a GPU of a host device 111 via direct memory access (DMA). The GPU of the host device 111 can include other machine learning models to predict other results. For example, the other machine learning models may comprise facial recognition to determine drivers of the vehicles, license plate recognition to record license plates, etc. The SmartNICs 112 can be used to decode and process live video feeds as packets are received from a network. This will offload the processing of the initial video feeds from the host device 111, allowing the host device resources to be used for processing the other machine learning models to predict the other results. The embodiments provide a system to control and orchestrate processing by the host devices 111 and SmartNICs 112, as well as offering the resource-sharing and security mechanisms described herein, so that such a use case can be hosted in a multi-tenant environment (e.g., Telco edge environment).

The user devices 102, host devices 111 and SmartNICs 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, as described herein, processing devices in some embodiments are implemented at least in part utilizing virtual resources such as VMs or containers (e.g., Linux containers (LXCs)), or combinations of both as in an arrangement in which Docker containers or other types of LXCs are configured to run on VMs.

The user devices 102, host devices 111 and SmartNICs 112 (or one or more components thereof) may be implemented on respective distinct processing platforms, although numerous other arrangements are possible. For example, in some embodiments at least portions of one or more of the host devices 111 and one or more of the SmartNICs 112 are implemented on the same processing platform.

Additionally, as noted herein, the host devices 111 and/or SmartNICs 112 in some embodiments may be implemented as part of a cloud-based system (e.g., cloud service provider 110). The user devices 102, host devices 111 and SmartNICs 112 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 104, the fabric 170, etc.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 111 and SmartNICs 112 are possible, in which certain ones of the host devices 111 and SmartNICs 112 reside in one data center in a first geographic location while other ones of the host devices 111 and SmartNICs 112 reside in at least a second data center in at least a second geographic location that is potentially remote from the first geographic location. Thus, it is possible in some implementations of the system 100 for different ones of host devices 111 and SmartNICs 112 to reside in different geographic locations. Numerous other distributed implementations of the host devices 111 and SmartNICs 112 are possible.

Additional examples of processing platforms utilized to implement portions of the system 100 in illustrative embodiments will be described in more detail below in conjunction with FIGS. 5 and 6.

It is to be understood that the particular set of elements shown in FIG. 1 for assigning one or more SmartNICs 112 to execute one or more workloads 103 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for assigning one or more SmartNICs to execute one or more workloads will now be described in more detail with reference to the flow diagram of FIG. 4. It is to be understood that this particular process is only an example, and that additional or alternative processes for assigning one or more SmartNICs to execute one or more workloads can be carried out in other embodiments.

The process 400 as shown includes steps 402 through 408, and is suitable for use in the system 100 but is more generally applicable to other types of systems for assigning one or more SmartNICs to execute one or more workloads. Other arrangements of user devices, cloud storage providers and/or other system components can be configured to perform at least portions of one or more of the steps in other embodiments.

In step 402, a request for at least one network interface card resource (e.g., SmartNIC resource) is received. In step 404, one or more network interface cards comprising the at least one network interface card resource are identified. A cluster including one or more nodes comprising the identified one or more network interface cards is generated. A cloud service provider hosts the one or more interface cards. According to an embodiment, the one or more network interface cards comprise SmartNICs, and the at least one network interface card resource comprises at least one of a CPU, a GPU, a partition of a CPU, GPU computational time slices and GPU memory.

In step 406, at least one virtualized computing resource image is received. The at least one virtualized computing resource image can be uploaded from a user device, and comprises a container image and/or a VM image.

In step 408, a workload is executed using an instance of the at least one virtualized computing resource image running on the one or more network interface cards. In connection with the execution of the workload, one or more metrics of the one or more nodes of the cluster are monitored. In one or more embodiments, the at least one virtualized computing resource image is executable on the one or more network interface cards and on a host device of the cloud service provider.

Executing the workload comprises implementing a binding mechanism using one or more cgroups and a given protocol, wherein the one or more cgroups isolate the workload, and the given protocol comprises an XDP protocol. The instance of the at least one virtualized computing resource image is eliminated and the at least one network interface card resource is released following completion of the executing of the workload.

Figure 4:
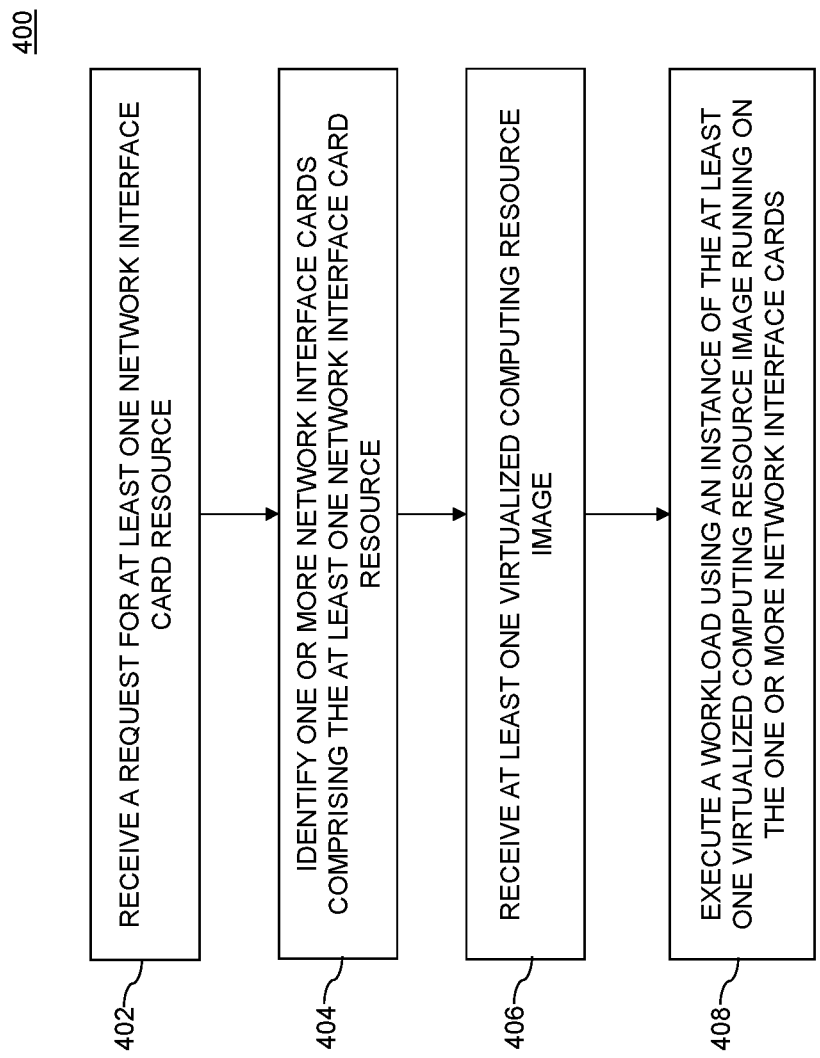
FIG. 4 is a flow diagram of an exemplary process for assigning one or more SmartNICs to execute one or more workloads in an illustrative embodiment.

It is to be appreciated that the FIG. 4 process and other features and functionality described above can be adapted for use with other types of information systems configured to assign one or more SmartNICs of a cloud service provider or other type of service provider to execute one or more workloads.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions that unlock the capabilities of SmartNICs for end users by providing SmartNIC resources as a service to which a user can subscribe. As a result, users can run custom and complex workloads that would otherwise have a longer lead time on the user's local platform. As noted herein, a SmartNIC is a type of network interface controller that comprises built-in computation resources such as, for example, CPUs, RAMs, FPGAs and GPUs. SmartNICs can also access hardware devices on a host machine directly, bypassing the host kernel and user spaces, so that real-time processing can be accelerated without host involvement. Some of the workloads that may be handled by a SmartNIC running its own operating system separate from operating system of a host device include machine learning prediction and training, storage processes, administrative processes, system level processes and hypervisor processes.

Due to concerns with security, resource management and orchestration caused by the co-location of workloads with other system processes on a SmartNIC, there are technical problems for developers and customers with leveraging SmartNICs in multi-tenant environments. For example, cloud service providers have prevented users from accessing SmartNIC resources due to the lack of resource allocation and workload isolation mechanisms.

The embodiments address these concerns by providing technical solutions which use containers, cgroups, namespaces and specialized protocols to achieve isolation between system and customer workloads on SmartNICs. For example, as a workload is executed on a container of a SmartNIC, the technical solutions described herein implement a binding mechanism using cgroups and XDP protocol. The cgroups and XDP protocol isolate workloads and bind network traffic to an application container using XDP drivers which, due to their fast processing, allow for avoidance of unnecessary cross-transmission of traffic to system level workloads. As a result, the technical solutions described herein provide an environment that separates system level workloads from custom user workloads so that SmartNIC services can be utilized for user workloads without fear of corrupting the system level workloads.

Advantageously, the embodiments also provide techniques for container-based orchestration of SmartNIC workloads based on service plan selection. For example, the technical solutions described herein enable users to request SmartNIC resources from one or more service plans and manage the usage of the requested SmartNIC resources based on a kernel's mechanism for aggregating and/or partitioning containers. The techniques disclosed herein eliminate cloud service provider entrance barriers so that users may have unrestricted access to develop and orchestrate advanced workloads in larger edge and/or multi-cloud environments.

As an additional advantage, the technical solutions described herein provide a declarative model for SmartNIC usage that enables users to harness the resources within SmartNICs or off-board the resources by declaring the type and amount of resources required to run a certain application in a given resource request. As a result, the embodiments facilitate interoperability and platform independence so that users are not restricted to a particular SmartNIC vendors.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a VM or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including VMs and/or container sets implemented using a virtualization infrastructure that runs on a physical infrastructure. The cloud infrastructure further comprises sets of applications running on respective ones of the VMs and/or container sets.

These and other types of cloud infrastructure can be used to provide what is also referred to herein as a multi-tenant environment. One or more system components such as the cloud service providers 110 or portions thereof are illustratively implemented for use by tenants of such a multi-tenant environment.

As mentioned previously, cloud infrastructure as disclosed herein can include cloud-based systems. VMs provided in such systems can be used to implement at least portions of one or more of a computer system and a cloud service provider in illustrative embodiments.

Illustrative embodiments of processing platforms utilized to implement functionality for assigning one or more SmartNICs to execute one or more workloads will now be described in greater detail with reference to FIGS. 5 and 6. Although described in the context of system 100, these platforms may also be used to implement at least portions of other information processing systems in other embodiments.

Figure 5:
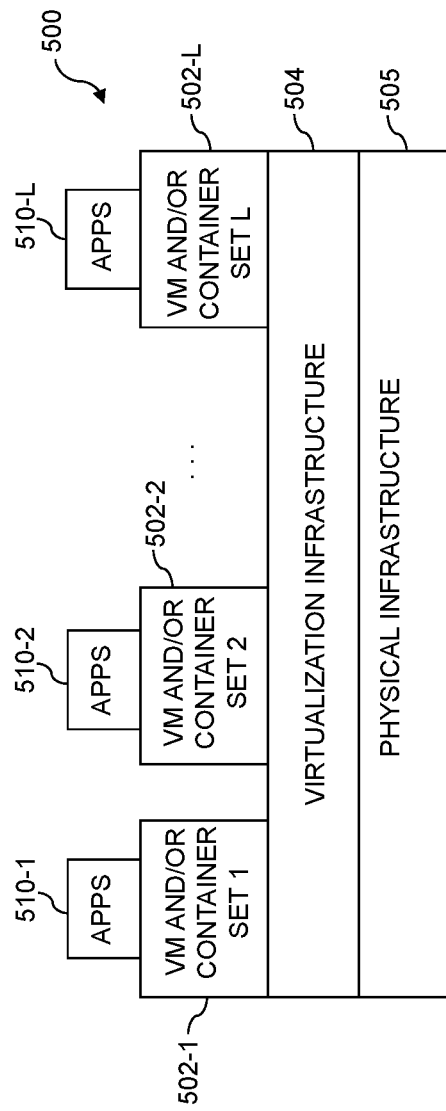
FIGS. 5 and 6 show examples of processing platforms that may be utilized to implement at least a portion of an information processing system in illustrative embodiments.
Figure 6:
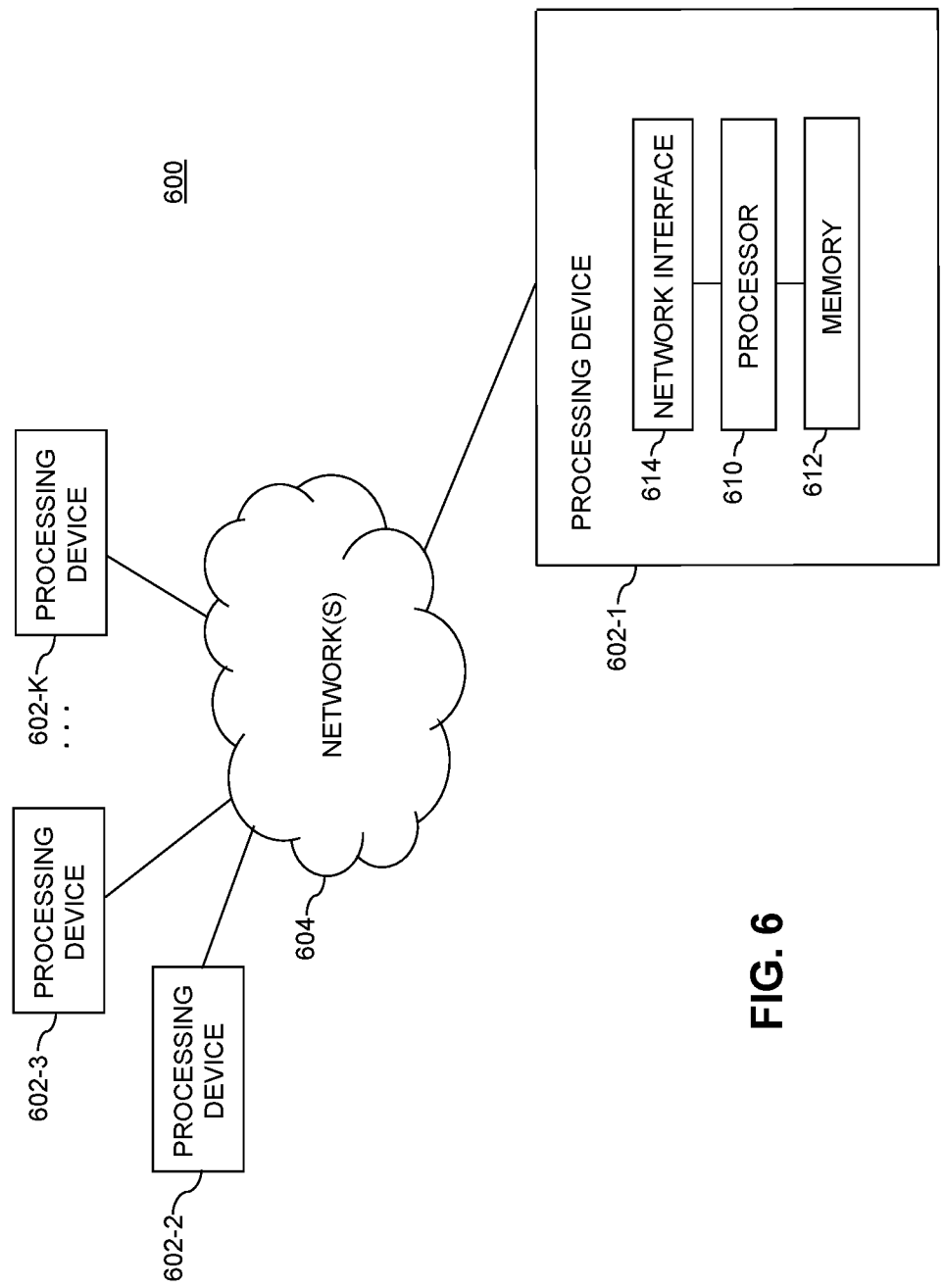

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), an FPGA, a CPU, a GPU, a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing and utilizing network interface card resources for workload execution as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, SmartNIC hardware, fabric connections, cloud service providers, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  receiving, in a cloud-based system comprising a plurality of host devices and a plurality of network interface cards, a request for at least one network interface card resource, the host devices having respective first operating systems and the network interface cards having respective second operating systems that are separate from the first operating systems of the host devices, the cloud-based system providing a multi-tenant environment in which network card resources are shared among multiple tenants, the request being received from a user device associated with a particular one of the tenants;
  identifying, in the cloud-based system, one or more of the network interface cards comprising the at least one network interface card resource;
  receiving, in the cloud-based system, at least one virtualized computing resource image;
  determining, in the cloud-based system, at least one associated kernel image for the one or more network interface cards, the kernel image for the one or more network interface cards being different than kernel images of the host devices and identifying one or more namespaces associated with the particular tenant, the one or more namespaces being utilized in the cloud-based system to provide isolation in workload execution, on the one or more network interface cards, between the particular tenant and other ones of the multiple tenants; and
  executing, in the cloud-based system, a workload using an instance of the at least one virtualized computing resource image running on the one or more network interface cards utilizing the one or more namespaces identified by the kernel image;
  wherein the method is performed by at least one processing device of the cloud-based system, the at least one processing device comprising a processor coupled to a memory.

2. The method of claim 1 wherein the at least one virtualized computing resource image comprises one of a container image and a virtual machine image.

3. The method of claim 1 further comprising generating a cluster including one or more nodes comprising the identified one or more network interface cards comprising the at least one network interface card resource.

4. The method of claim 3 further comprising monitoring one or more metrics of the one or more nodes.

5. The method of claim 1 wherein the at least one processing device is a component of a cloud service provider hosting the one or more network interface cards.

6. The method of claim 5 wherein the at least one virtualized computing resource image is uploaded to the cloud service provider from a user device.

7. The method of claim 5 wherein the at least one virtualized computing resource image is executable on the one or more network interface cards and on a host device of the cloud service provider.

8. The method of claim 1 wherein the one or more network interface cards comprise smart network interface cards, and the at least one network interface card resource comprises at least one of a central processing unit, a graphics processing unit, a partition of a central processing unit, graphics processing unit computational time slices and graphics processing unit memory.

9. The method of claim 1 wherein executing the workload comprises implementing a binding mechanism using one or more control groups and a given protocol.

10. The method of claim 9 wherein the one or more control groups isolate the workload.

11. The method of claim 9 wherein the given protocol provides a programmable network data path in a kernel.

12. The method of claim 1 further comprising eliminating the instance of the at least one virtualized computing resource image following completion of the executing of the workload.

13. The method of claim 1 further comprising releasing the at least one network interface card resource following completion of the executing of the workload.

14. An apparatus, comprising:
at least one processor and at least one memory storing computer program instructions wherein, when the at least one processor executes the computer program instructions, the apparatus is configured:
to receive, in a cloud-based system comprising a plurality of host devices and a plurality of network interface cards, a request for at least one network interface card resource, the host devices having respective first operating systems and the network interface cards having respective second operating systems that are separate from the first operating systems of the host devices, the cloud-based system providing a multi-tenant environment in which network card resources are shared among multiple tenants, the request being received from a user device associated with a particular one of the tenants;
to identify, in the cloud-based system, one or more of the network interface cards comprising the at least one network interface card resource;
to receive, in the cloud-based system, at least one virtualized computing resource image;
to determine, in the cloud-based system, at least one associated kernel image for the one or more network interface cards, the kernel image for the one or more network interface cards being different than kernel images of the host devices and identifying one or more namespaces associated with the particular tenant, the one or more namespaces being utilized in the cloud-based system to provide isolation in workload execution, on the one or more network interface cards, between the particular tenant and other ones of the multiple tenants; and
to execute, in the cloud-based system, a workload using an instance of the at least one virtualized computing resource image running on the one or more network interface cards utilizing the one or more namespaces identified by the kernel image.

15. The apparatus of claim 14 wherein the apparatus is further configured to generate a cluster including one or more nodes comprising the identified one or more network interface cards comprising the at least one network interface card resource.

16. The apparatus of claim 14 wherein, in executing the workload, the apparatus is configured to implement a binding mechanism using one or more control groups and a given protocol.

17. The apparatus of claim 14 wherein the apparatus is further configured to eliminate the instance of the at least one virtualized computing resource image following completion of the executing of the workload.

18. A computer program product stored on a non-transitory computer-readable medium and comprising machine executable instructions, the machine executable instructions, when executed, causing a processing device:
to receive, in a cloud-based system comprising a plurality of host devices and a plurality of network interface cards, a request for at least one network interface card resource, the host devices having respective first operating systems and the network interface cards having respective second operating systems that are separate from the first operating systems of the host devices, the cloud-based system providing a multi-tenant environment in which network card resources are shared among multiple tenants, the request being received from a user device associated with a particular one of the tenants;
to identify, in the cloud-based system, one or more of the network interface cards comprising the at least one network interface card resource;
to receive, in the cloud-based system, at least one virtualized computing resource image;
to determine, in the cloud-based system, at least one associated kernel image for the one or more network interface cards, the kernel image for the one or more network interface cards being different than kernel images of the host devices and identifying one or more namespaces associated with the particular tenant, the one or more namespaces being utilized in the cloud-based system to provide isolation in workload execution, on the one or more network interface cards, between the particular tenant and other ones of the multiple tenants; and
to execute, in the cloud-based system, a workload using an instance of the at least one virtualized computing resource image running on the one or more network interface cards utilizing the one or more namespaces identified by the kernel image.

19. The computer program product of claim 18 wherein in executing the workload, the machine executable instructions cause the processing device to implement a binding mechanism using one or more control groups and a given protocol.

20. The computer program product of claim 18 wherein the machine executable instructions further cause the processing device to eliminate the instance of the at least one virtualized computing resource image following completion of the executing of the workload.

* * * * *